(12) United States Patent
Oldendorf et al.

(10) Patent No.: US 7,789,293 B2
(45) Date of Patent: Sep. 7, 2010

(54) DEVICE AND METHOD FOR DOSING BY USING A SCALE

(75) Inventors: Christian Oldendorf, Goettingen (DE); Swen Weitemeier, Adelebsen (DE); Jean Claude Bertoldi, Goettingen (DE)

(73) Assignee: Sartorius AG, Goettingen (DE)

( * ) Notice: Subject to any disclaimer, the term of this patent is extended or adjusted under 35 U.S.C. 154(b) by 152 days.

(21) Appl. No.: 11/970,179

(22) Filed: Jan. 7, 2008

(65) Prior Publication Data

US 2008/0105738 A1    May 8, 2008

Related U.S. Application Data

(63) Continuation of application No. PCT/EP2006/006373, filed on Jun. 30, 2006.

(30) Foreign Application Priority Data

Jul. 5, 2005    (DE) .................. 10 2005 031 269

(51) Int. Cl.
G06F 17/00    (2006.01)
(52) U.S. Cl. .................. 235/375; 235/487; 235/486; 235/435
(58) Field of Classification Search .............. 235/375, 235/487, 446, 439, 435, 486; 700/236–242
See application file for complete search history.

(56) References Cited

U.S. PATENT DOCUMENTS

| | | |
|---|---|---|
| 5,847,328 A | 12/1998 | Oldendorf et al. |
| 7,369,919 B2 * | 5/2008 | Vonk et al. .................. 700/236 |
| 2002/0027507 A1 * | 3/2002 | Yarin et al. .............. 340/573.1 |
| 2003/0010541 A1 | 1/2003 | Oldendorf |
| 2003/0141116 A1 | 7/2003 | Nuesch et al. |
| 2004/0133306 A1 | 7/2004 | Schmid |
| 2005/0168337 A1 * | 8/2005 | Mahoney ............... 340/539.12 |
| 2006/0041330 A1 * | 2/2006 | Ansari et al. ................. 700/240 |

FOREIGN PATENT DOCUMENTS

| | | |
|---|---|---|
| DE | 44 07 433 A1 | 9/1995 |
| DE | 299 14 925 U1 | 12/1999 |
| DE | 101 11 730 A1 | 10/2002 |
| DE | 101 34 281 A1 | 1/2003 |
| WO | WO 2005/071506 A1 | 8/2005 |

* cited by examiner

Primary Examiner—Edwyn Labaze
(74) Attorney, Agent, or Firm—Sughrue Mion, PLLC

(57) ABSTRACT

A device for dosing a number of constituents according to a given formula with a scale (1) containing a formula memory. The scale (1) is equipped with a transponder read unit (2), the given formula is storable in a transponder (4) and transmittable to the formula memory with the transponder read unit (2) and the transponder read unit (2) additionally monitors the dosed constituents during the dosing process. The storage containers (6) for the individual constituents are each provided with transponders (7), so that the individual constituents can be identified by the transponder read unit (2). This enables a simple and reliable transmission of the formula data to the formula memory of the scale and monitoring of the dosing process. Furthermore, the scale can be operated in a generally contact-free manner.

17 Claims, 1 Drawing Sheet

DEVICE AND METHOD FOR DOSING BY USING A SCALE

This is a Continuation of International Application PCT/EP2006/006373, with an international filing date of Jun. 30, 2006, which was published under PCT Article 21(2) in German, and the disclosure of which is incorporated into this application by reference.

BACKGROUND OF THE INVENTION

1. Field of the Invention

The invention relates to a device and method for dosing a plurality of constituents of a predefined formula using a scale with a formula memory.

2. Description of the Related Art

Devices and methods of this kind are generally known. For example, German Publication DE 44 07 433 C2 describes a device in which the data of the formula is read only gradually into the formula memory of the scale during the dosing process. This has the result, however, that many convenience functions, such as dosing to zero and monitoring correct dosing are not available. Furthermore, from German Publication DE 101 11 730 A1 it is known to connect the device to a server by a wireless communication link and to transmit the predefined formula from the server to the formula memory of the scale over this communication link. However, this wireless communication link comes at an appreciable hardware cost and has the risk that the formula data that is read into the memory may be faulty because of transmission interference. This risk is significant particularly in an industrial environment.

OBJECT OF THE INVENTION

An object of the invention is to further develop a device and a method to allow simple and reliable transmission of the formula data to the formula memory of the scale as well as monitoring and optionally also documenting the dosing process.

SUMMARY OF THE INVENTION

In one aspect of the invention, this object is achieved by a device for dosing a plurality of constituents according to a predefined formula, the device including a scale having a formula memory and a transponder read unit, wherein the predefined formula is stored in a first transponder and is read into the formula memory using the transponder read unit, and wherein the transponder read unit is used to monitor the plurality of constituents dosed during a dosing process. According to another aspect, a method is provided for dosing a plurality of constituents according to a predefined formula using a scale having a formula memory, the method including transmitting the predefined formula from a central formula memory to a first transponder, transporting the first transponder from the central formula memory to the scale, reading the predefined formula stored in the first transponder with a transponder read unit, that is connected to the scale or integrated into the scale, into the formula memory, and monitoring a dosed constituent during a dosing process using the transponder read unit.

The use of a transponder as a portable intermediate memory for the formula makes it possible to read the formula being processed into this transponder, e.g., at a central computer system that contains all the current formulas, to transport it to the scale and to transmit it to the scale's formula memory by the transponder's read unit. The use of a transponder enables a contactless data transmission that is highly immune to interference because of the small range of the interrogation signals of the transponder read unit. The transponder is also not susceptible to dirt contamination, such as may easily occur, for example, in the dosing of paints and dyes. Even if the dosing device is located in an area subject to explosion hazards, data transport by transponder is not problematic.

The use of a transponder read unit furthermore makes it possible to monitor the execution of the dosing process. To this end the storage containers for the individual constituents are provided with transponders. As the storage containers pass the transponder read unit, the individual constituents can thus be identified and compared to the predefined constituents of the formula. This makes it possible to effectively monitor the formula.

The use of transponder read units in conjunction with scales is disclosed in, e.g., German Utility model DE 299 14 925 U1, German Laid Open Publication DE 101 34 281 A1 or U.S. Application 2003/0141116 A1. In all these publications, however, the transponder is used only to identify the material being weighed on the scale at any given moment or to identify the operator. None of these publications contain any indication as to using a transponder as a formula storage medium transportable independently from the material being weighed, reading the data into the formula memory of the scale and monitoring the dosed constituents during the dosing process.

In an exemplary embodiment, the transponder read unit also includes a transponder write unit. This makes it possible to transmit the data stored in the scale's electronics to a transponder. For, example, after the dosing process is complete, the actual values of the individual constituents can be read into a (new) transponder and that transponder can be affixed to the filled dosing container or attached to the shipping papers. As a result, the recipient of the finished blend receives the actual values of the individual constituents and can check the blend if necessary. This provides documentation and ensures traceability in the event of a mistake.

BRIEF DESCRIPTION OF THE DRAWINGS

The invention and other exemplary embodiments and applications will now be described with reference to the single FIG. 1, which shows a schematic diagram of the individual parts of the dosing device.

DETAILED DESCRIPTION OF EXEMPLARY EMBODIMENTS OF THE INVENTION

Figure 1:
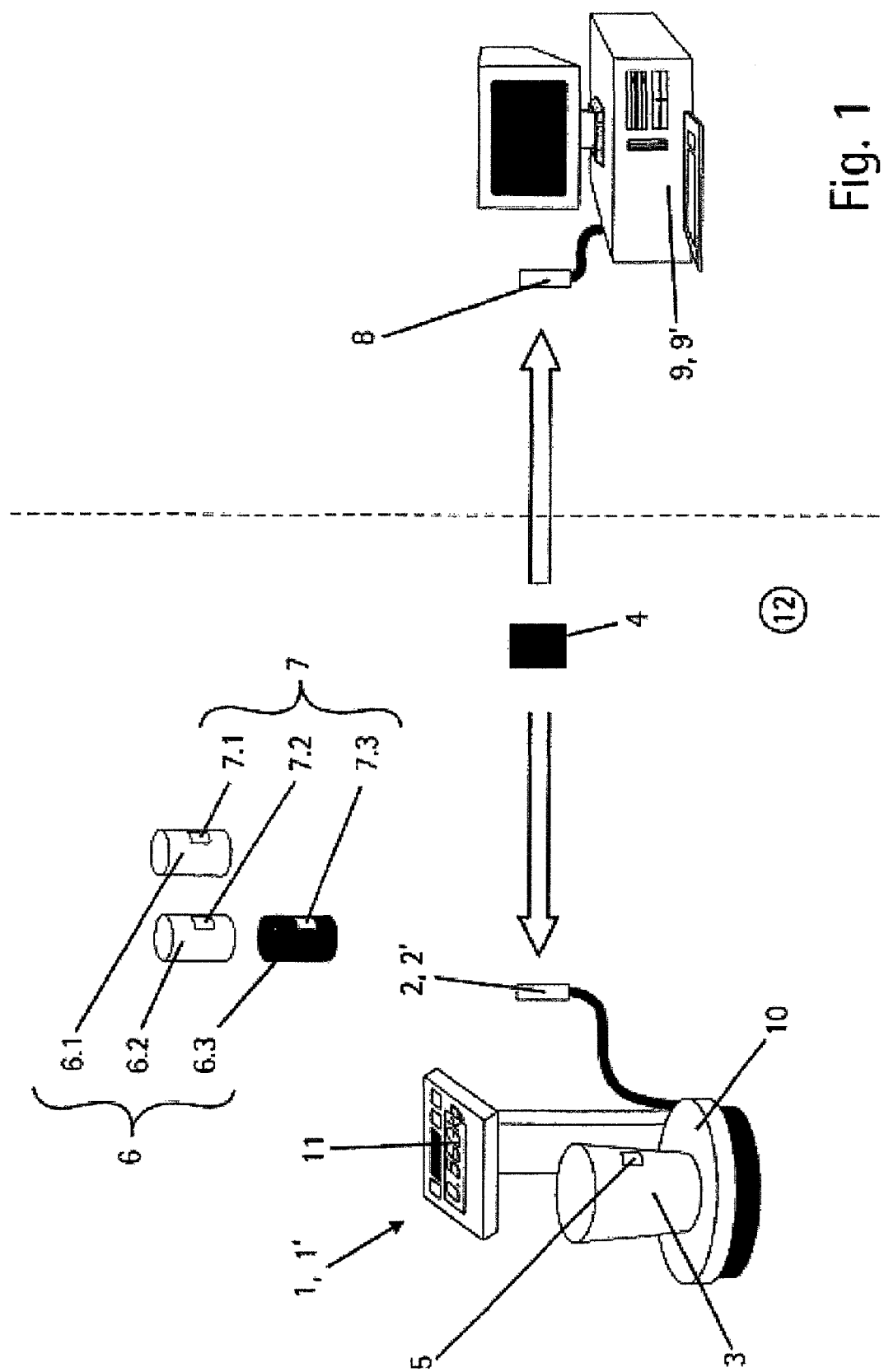

The dosing device includes a scale 1 with a scale tray 10 and a display 11. On the scale tray 10 is a dosing container 3 into which the operator is to dose the individual constituents according to a predefined formula. The individual constituents of the mixture to be prepared are located in storage containers 6, three of which (6.1 . . . 6.3) are shown in the FIGURE by way of example. Affixed to each of the storage containers is a transponder 7: transponder 7.1 on storage container 6.1, transponder 7.2 on storage container 6.2 and transponder 7.3 on storage container 6.3. The FIGURE further shows a computer system 9 as the memory for all the dosing formulas usable by the dosing device. This computer system includes, among other things, a transponder read/write unit 8 to read data from and write data to transponders. The FIGURE also shows a (transportable) transponder 4.

The construction and functioning of scales, computer systems, transponders and transponder read units or transponder read/write units are known to any person skilled in the art, so that the corresponding details do not need to be discussed here.

The interaction of the individual parts of the dosing device will now be described by means of several non-limiting examples.

Example 1

Basic Version

The operator of the dosing device retrieves the desired formula from the computer system 9 and transmits it to the transponder 4 using the transponder read/write unit 8. The operator then takes the transponder 4 to the mixing room 12 and transfers the formula to the formula memory 1' of the scale 1 using the transponder read unit 2. The scale 1 is thus prepared for the dosing process. It indicates the name of the first constituent and the amount to be dosed (with a negative sign) on the display 11 of the scale. The operator then takes the storage container of this constituent—e.g., the storage container 6.2—and moves it past the transponder read unit 2 so that the transponder 7.2 can be read. The electronics of the scale 1 then check whether the information on the substance inside the storage container 6.2 which is stored in the transponder 7.2 matches the first constituent required in the formula and outputs an error signal if they do not match (e.g., a blinking "wrong constituent" message and an acoustic error signal). If they match, the scale is tared and released for dosing. When the target weight of the first constituent is reached (plus or minus a predefined tolerance), the scale goes automatically to the second constituent which is requested, checked and dosed by the operator like the first constituent. The other constituents of the formula are processed in the same manner.

The described method achieves a simple and reliable transmission of formula data from the central formula memory 9' of the computer system 9 to the formula memory 1' of the scale 1. This transmission requires neither a cable connection nor a radio link between the scale and the computer system, so that the hardware cost is low. This applies particularly if the distance between the scale and the computer system is relatively large and if the mixing room is classified as being subject to explosion hazards. If a single computer system is used to provide a plurality of dosing devices with formulas, the transponder-based data transmission method according to the invention is also highly reliable and prevents, for example, the inadvertent transmission of a formula to the wrong scale.

The transponders 7 on the individual storage containers 6 furthermore ensure effective monitoring of the dosed substances, so that misdosing—i.e., the use of a wrong constituent—is safely avoided.

Example 2

With Freely Selectable Sequence

The method described in example 1 may be supplemented such that the scale proposes a certain sequence of the individual constituents for dosing on the display but also allows other sequences. When the substance information stored in transponder 7 is checked against the requested constituent, an error signal is therefore output only if that substance does not appear in the formula at all or if it has already been dosed. If an allowed substance is detected, the amount to be dosed of that substance is shown on the display and optionally also the name of the substance, and the dosing of the substance can proceed in the usual manner.

This variant gives the operator of the scale more latitude than the variant of example 1.

Example 3

With Additional Transponder Write Unit

If the dosing device has not only a transponder read unit 2 but also a transponder write unit 2', which may optionally also be integrated into the transponder read unit 2—as shown in the figure—the data from the scale 1 can also be written to a transponder. For example, the actual dosed values of the individual constituents can be stored in the electronics of the scale, and after completion of the dosing process all the constituents can be written to a transponder. This may, for example, be the transponder 5 affixed to the dosing container 3 or affixable to the dosing container 3 in a suitable manner after the write process of the data is complete. It may also be the transponder 4, however. In one exemplary embodiment, the memory 1' in the electronics of the scale 1 allows the storage of the actual values for a plurality of dosings. After completion of a dosing series using the same formula, the actual values of all the dosings and the formula can be written to the transponder 4, for example, using the transponder write unit 2' and transmitted to the central computer system 9 by the transponder 4. The actual data can then be archived in the computer system 9 and used for various purposes, such as to update the inventory of the individual substances, to create delivery slips and/or invoices, for statistical analysis, etc. The transmission of relatively large data volumes using the transponder 4 requires of course a correspondingly large amount of memory in the transponder 4.

The above-described updating of the inventory of the individual substances at the level of the central computer system 9 can of course also be done at the level of the individual storage containers 6. If the storage container 6, with the associated transponder 7, is moved past the transponder read/write unit 2, 2' and its data is read for monitoring purposes not only at the beginning of dosing of that constituent—as explained with reference to example 1—but also after dosing of that constituent is complete, the amount of the substance just used can be taken from the electronics of the scale and subtracted from the previous net content. The net content still remaining in that storage container is then always stored in the transponder 7. This makes it possible not only to check that the correct substance was used for each dosing but also to verify that the remaining amount is sufficient for the planned dosing.

If the transponder 5 is affixed to the dosing container 3 in advance, the data of the dosing container can be stored in this transponder 5, e.g., its size or volume and the material it is made of. If the dosing container is then moved past the transponder read unit 2 before being placed on the weighing tray of the scale, the electronics of the scale can check whether the dosing container is suitable for the planned dosing. This also excludes any inadvertent use of a wrong dosing container.

As may be seen from the described non-limiting examples, the formula is transferred to the formula memory of the scale and dosing is performed without having to press any of the keys of the scale. The described device and method are therefore optimal particularly in those applications where the operator wears or has to wear gloves, or where there is a substantial risk that the scale will become contaminated with dirt during operation.

What has been said above always assumes that the operator doses the substance amount required by the formula. Any inadvertent overdosing of a formula constituent can of course be "remedied" by slightly adjusting the other constituents. The cited German Publication DE 44 07 433 C2 describes a method for this process. Because the complete formula is stored in the formula memory of the scale of the device according to the invention, this correction program can be executed with just a few keystrokes on the scale.

It is also possible, however, to intentionally deviate from the formula. This is necessary, for example, if older cars have to be repainted and the original color has to be adjusted to the faded color. If the actual values of the individual constituents are stored in the transponder 5 as described in example 3, this special mixture is clearly documented on the container and there is no risk of inadvertently confusing that container with others containing the standard mixture. If the special mixture does not yet quite match the desired color, the actual composition of the special mixture can also be read back into the formula memory of the scale 1 using the transponder read unit 2, and the operator of the scale can prepare an improved special mixture by further deviating from that formula.

Programming details, such as the data transmission protocol and check routines to reject "wrong" transponders that do not belong to the dosing device and are inadvertently held in front of one of the transponder read units, check bits to ensure error-free data transmission and data storage, etc., are not explained above, since they are readily accessible to anyone skilled in electronics.

The above description of the exemplary embodiments of the invention has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A device for dosing a plurality of constituents according to a predefined formula, comprising:
    a scale configured to weigh the constituents and having a formula memory and a transponder read unit,
    wherein the predefined formula is stored in a first transponder and is read into the formula memory using the transponder read unit, and
    wherein the transponder read unit is used to monitor the plurality of constituents dosed during a dosing process.

2. The device as claimed in claim 1, further comprising respective storage containers for each of the plurality of constituents, each storage container provided with a respective second transponder, such that each constituent of each respective storage container is identified by the transponder read unit.

3. The device as claimed in claim 1, wherein the transponder read unit also comprises a transponder write unit, and the scale further comprises a storage unit in which actual dosing values are stored, and wherein the actual dosing values are read into at least one of the first transponder and a third transponder by the transponder write unit.

4. The device as claimed in claim 3, wherein the third transponder is assigned to a dosing container that contains a mixture of the dosed constituents.

5. The device as claimed in claim 3, wherein actual current values for a plurality of dosings are stored in the storage unit.

6. The device as claimed in claim 1, wherein the scale is operative to determine an inadvertent overdosing of one constituent and is operative to execute a correction program to adjust the dosing of remaining constituents of the plurality of constituents.

7. A method for dosing a plurality of constituents according to a predefined formula using a scale having a formula memory, the method comprising:
    transmitting the predefined formula from a central formula memory to a first transponder,
    transporting the first transponder from the central formula memory to the scale,
    reading the predefined formula stored in the first transponder with a transponder read unit connected to the scale or integrated into the scale, into the formula memory, and using the scale and the transponder read unit to dose at least one of the constituents.

8. The method as claimed in claim 7, wherein said using comprises:
    comparing a first constituent identified by the transponder read unit and by a second transponder provided on a respective storage container with constituents defined in the predefined formula but not yet dosed, and
    transferring a target weight of the first constituent to a display of the scale if there is a match, and outputting an error message if there is no match.

9. The method as claimed in claim 8 wherein, during the dosing, when the target weight of the first constituent, plus or minus a predefined tolerance, is reached, the scale is automatically prepared to receive a next constituent of the predefined formula.

10. The method as claimed in claim 8, wherein the transponder read unit also comprises a transponder write unit, and an amount of the first constituent is stored in the second transponder on the storage container and after dosing the first constituent, the amount of the first constituent remaining in the storage container is updated in the second transponder on the storage container by the transponder write unit.

11. The method as claimed in claim 7, wherein the transponder read unit also comprises a transponder write unit, and an actual current value of each constituent in the predefined formula is stored in the formula memory of the scale, and after completion of dosing of all constituents, actual current values of each constituent are read into a third transponder by means of the transponder write unit, and the third transponder is assigned to a dosing container.

12. The method as claimed in claim 7, wherein the transponder read unit further comprises a transponder write unit, an actual current value of each constituent of the predefined formula is stored in the formula memory of the scale, and, after completion of a plurality of dosings, actual current values of each constituent are read into the first transponder by the transponder write unit, and are transmitted to a computer system by the first transponder.

13. The method as claimed in claim 7, wherein the central formula memory is provided in a computer system.

14. The method as claimed in claim 7, wherein the first transponder is transported separate from the scale and separate from any of the constituents.

15. A method for tracking a dosage of a plurality of constituents, comprising:
    transmitting a formula containing a desired dosage of each of the plurality of constituents to a transponder unit;
    transferring the formula in the transponder unit to a memory of a scale; and
    dosing the desired dosage of each of the plurality of constituents in accordance with the formula,
    wherein each of the plurality of constituents is contained in a respective container and prior to dosing each respective constituent, a transponder provided on each respective container is read to determine if the respective constituent matches a requested constituent of the formula, and wherein the transponder unit is portable and is independent of the scale.

16. The method according to claim 15, wherein the formula is transmitted to the transponder unit from a computer system that is independent from both the transponder unit and the scale.

17. An arrangement for dosing a plurality of constituents according to a predefined formula, comprising:

a scale having a formula memory and a transponder read unit, a transponder external to the scale, wherein the formula memory is configured to store the predefined formula from the transponder via the transponder read unit, and wherein the scale is configured to weigh the constituents and execute an algorithm that compares the actual weights of the constituents with predetermined constituent weights from the predefined formula stored in the formula memory.

* * * * *